Feb. 9, 1971    R. L. BUTZKO    3,561,057
APPARATUS FOR THE PRODUCTION OF FORMED ARTICLES
FROM PLASTIC SHEET MATERIAL
Filed June 5, 1967    7 Sheets-Sheet 1
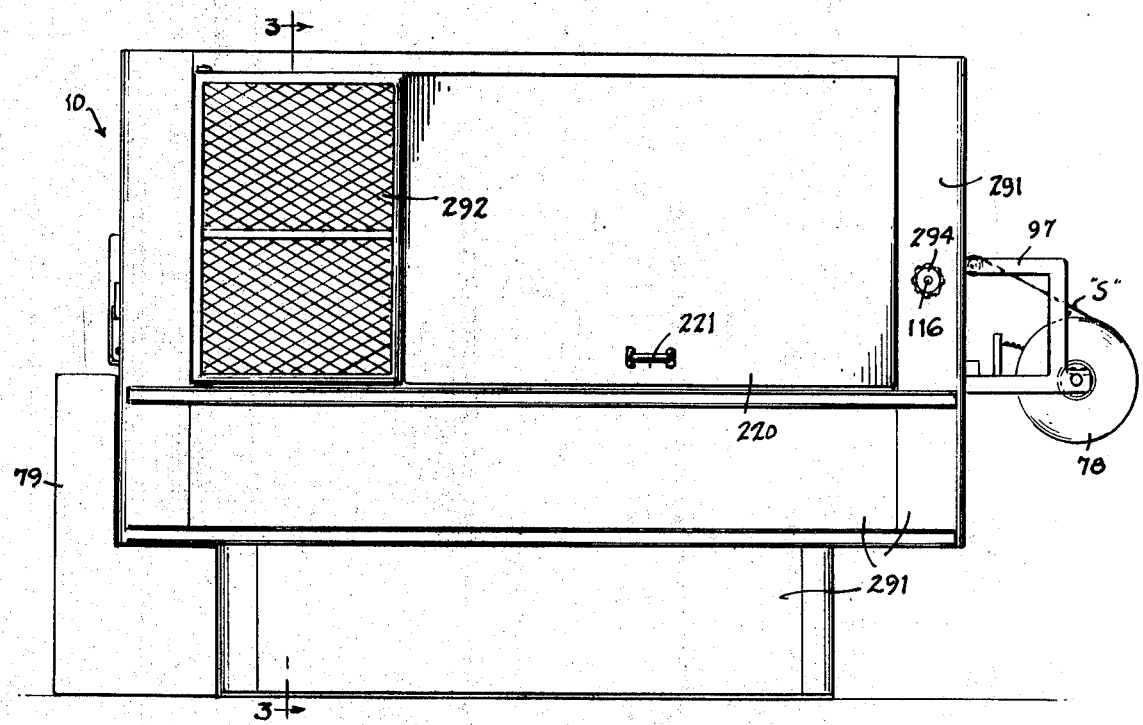
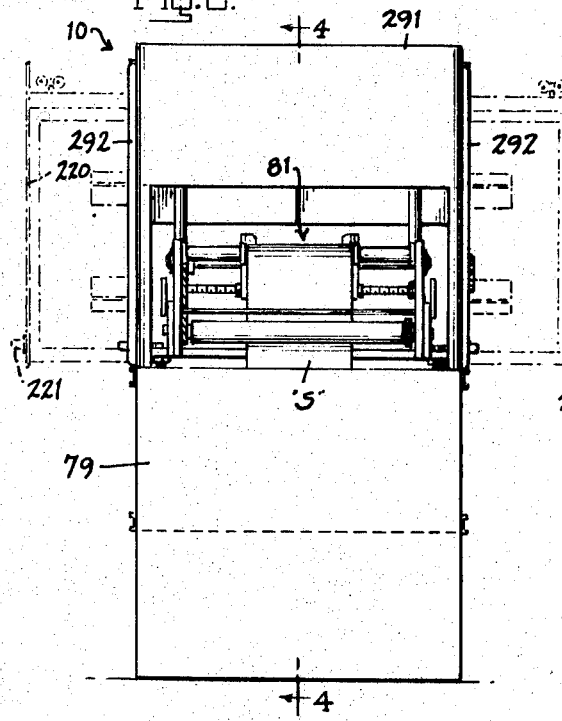
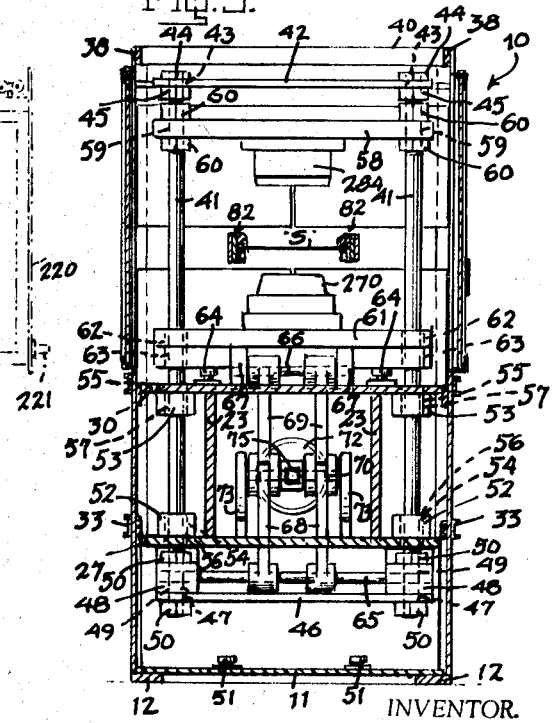
INVENTOR.
ROBERT L. BUTZKO
BY
Mattern, Ware and Davis
ATTORNEYS.

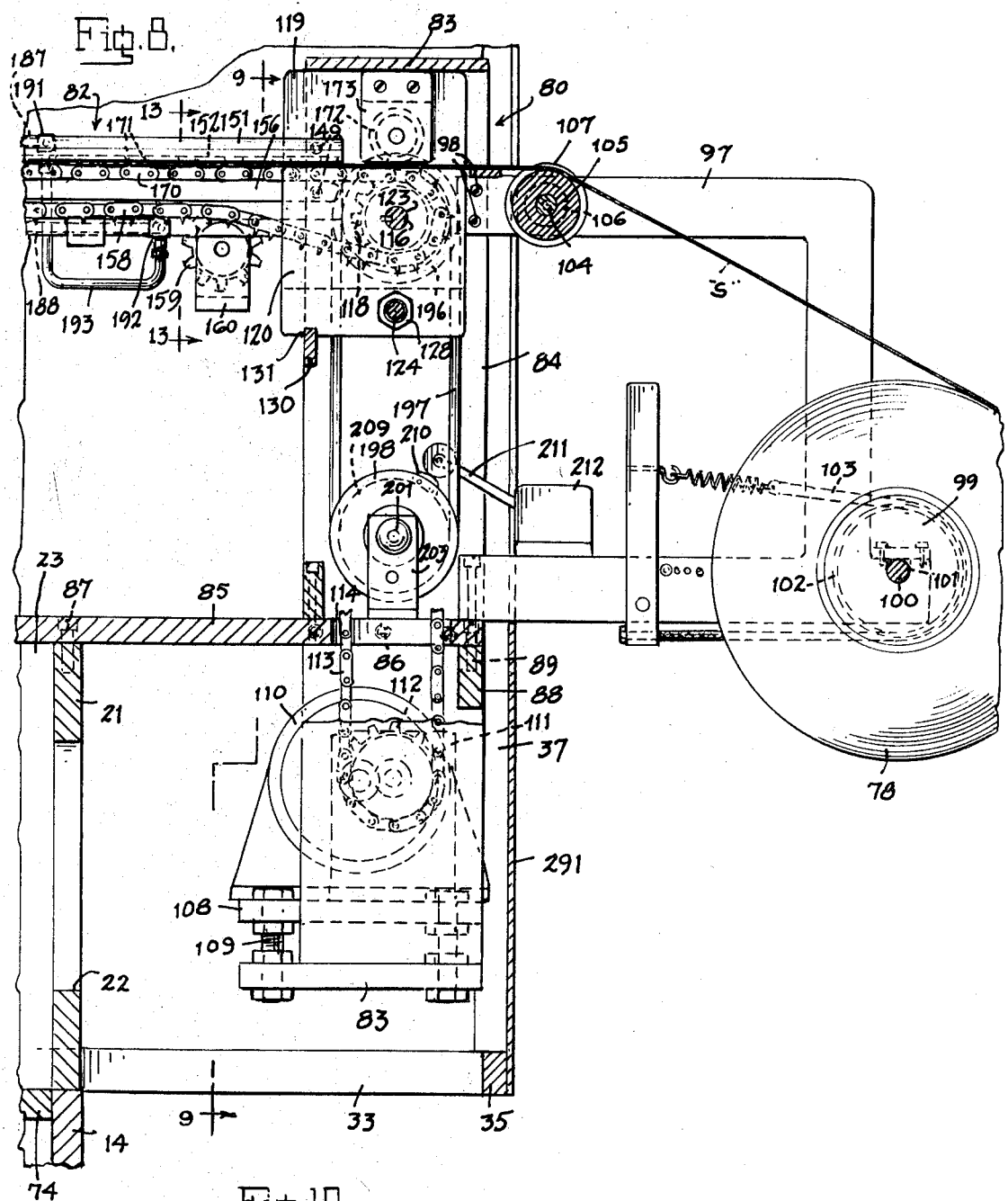

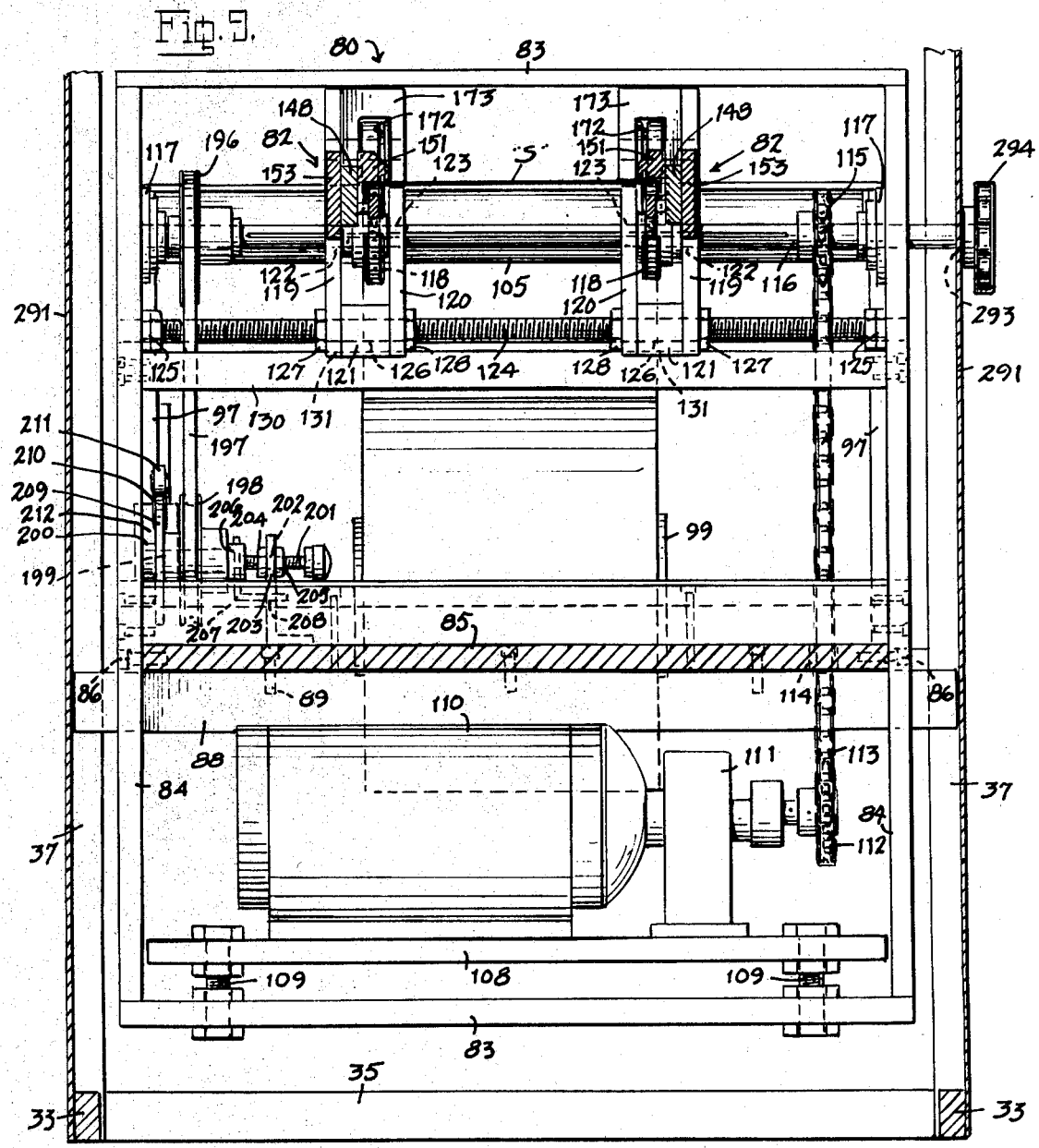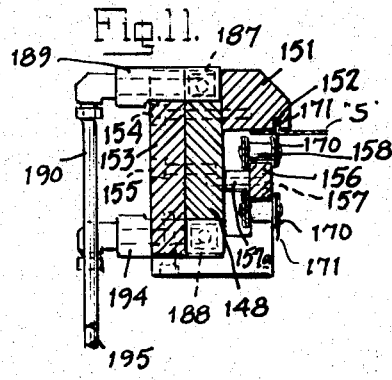

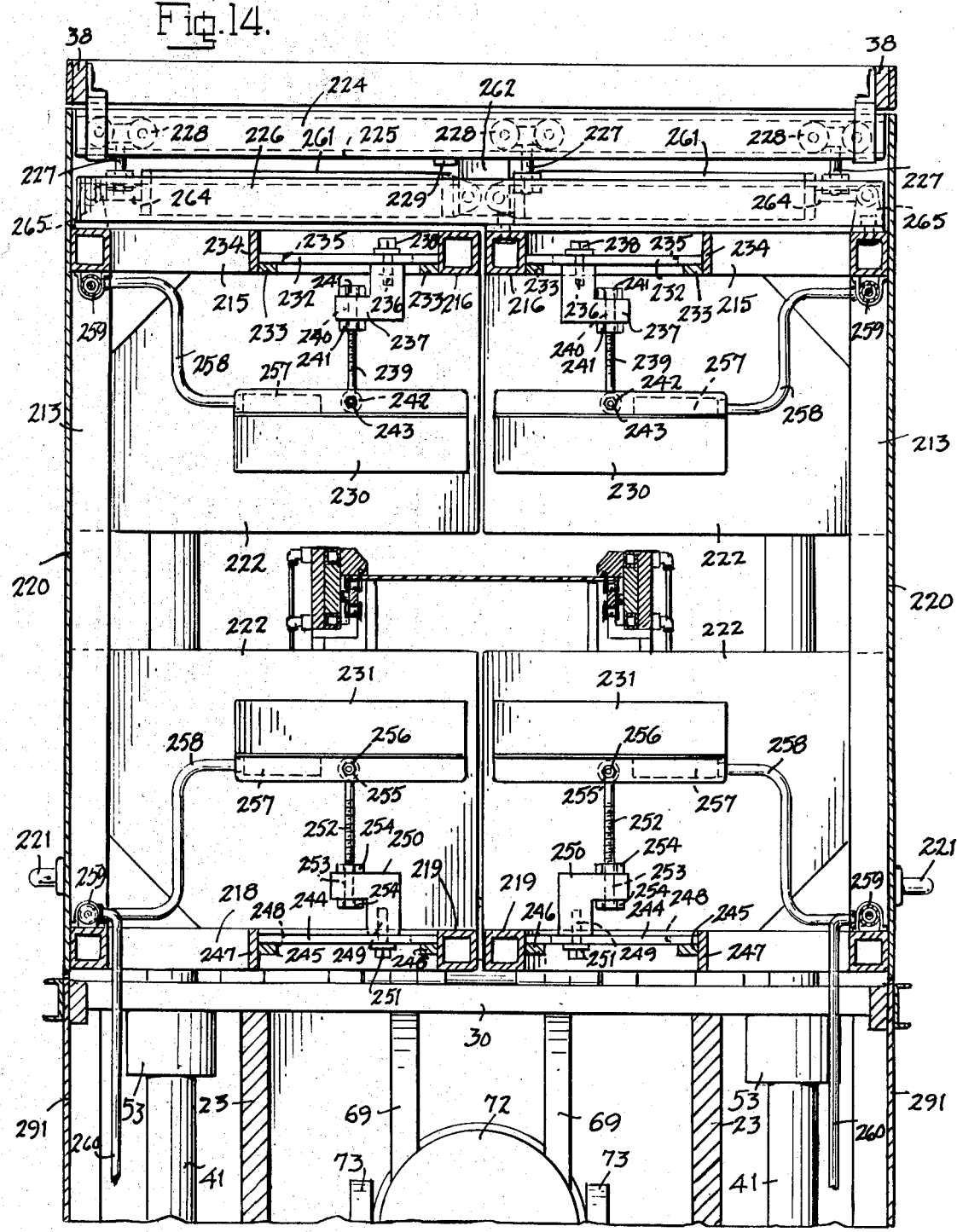

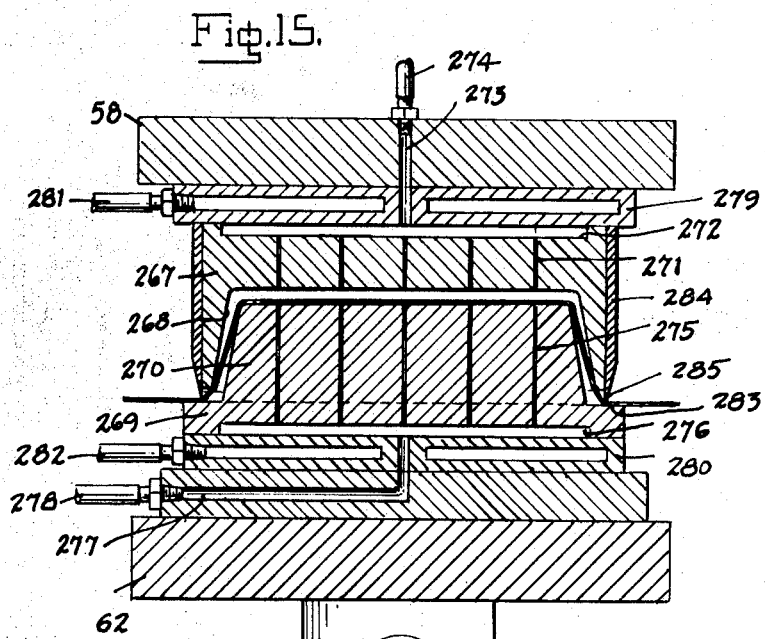
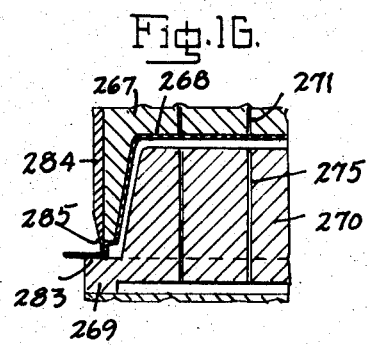
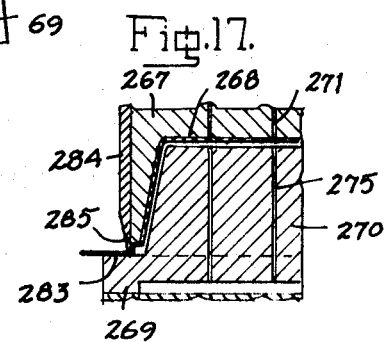

United States Patent Office 3,561,057
Patented Feb. 9, 1971

3,561,057
APPARATUS FOR THE PRODUCTION OF FORMED
ARTICLES FROM PLASTIC SHEET MATERIAL
Robert L. Butzko, 165 Holland Ave.,
Fairfield, Conn. 06605
Filed June 5, 1967, Ser. No. 643,665
Int. Cl. B29d 17/00
U.S. Cl. 18—19                                             12 Claims

ABSTRACT OF THE DISCLOSURE

An apparatus for the production of formed articles from plastic sheet material, wherein feeding, heating, forming and cutting operations upon a step-by-step advanced strip of the plastic sheet material are carried out in related stages, wherein the marginal edges of the strip are secured to the feeding means during its advance through the machine, and wherein the heating means is arranged in immediate juxtaposition to the forming means to present the material to the forming means at its optimum temperature for forming.

SUMMARY OF THE INVENTION

The present invention relates to an apparatus for the production of formed articles from plastic sheet material, and has for an object to provide an apparatus of this type wherein the feeding, heating, forming and cutting operations upon the plastic material are carried out in related stages, so arranged as to permit of the efficient use of various thermoplastic or thermo-setting materials of either oriented or non-oriented type including such materials as polystyrene foam sheeting. To this end it is proposed to provide improved means for clamping the edges of the material during its advance through the machine so as to prevent distortion and crumbling under the high temperatures required for forming such materials and further to provide heating means arranged in such immediate juxtaposition to the forming and cutting means that the forming operation may be performed while the material is at its optimum temperature for forming.

It is a further object of the invention to provide a forming and cutting means wherein the cutting operation takes place in the forming station, and particularly to provide cutting means in the form of a perpendicular cutting blade surrounding one of the forming dies and corresponding to the outline shape of the article being formed, and which co-operates with the flat surface of an opposed die to grip the material and form an airtight seal during the forming operation without penetrating the sheet material, and at the completion of the forming operation to cause the blade to be forced toward the flat surface to penetrate the sheet material to the point where the formed article is substantially severed from the sheet, so as to enable it to be readily separated therefrom by slight pressure at a stripping station following the advance of the material from the forming and cutting station. In this respect the attention is directed to applicant's prior patent for Apparatus for Forming Thermoplastic Sheet Material, No. 3,113,345 granted Dec. 10, 1963, which discloses a cutting blade surrounding a forming die and co-operating with a flat heating platen. The apparatus disclosed in this patent does not permit of the formation of extreme deep-draw articles, being limited to the formation of such articles as may be formed by vacuum and pressure in a cavity mold.

It is proposed in the present invention to utilize the cutting method disclosed in such patent with the improvement consisting of the incorporation in the dies of a deep-draw plug-assist technique in co-operation with the cavity mold and to incorporate the flat surface for co-operation with the cutting blade in either the plug-assist die in the cavity mold in the form of a flat area completely surrounding the plug formation on the mold cavity.

BRIEF DESCRIPTION OF THE DRAWINGS

FIG. 1 is a side view of the molding apparatus according to the invention;
FIG. 2 is a front view;
FIG. 3 is a transverse vertical sectional view, taken along the line 3—3 of FIG. 1;
FIG. 8 is a longitudinal vertical sectional view, on an enlarged scale, of the rearward drive end of the feed mechanism;
FIG. 9 is a transverse vertical sectional view, taken along the line 9—9 of FIG. 8, and showing the rearward drive end of the feed mechanism in front elevation;
FIG. 10 is a plan view, partially broken away, of one of the sprocket feed guide ways for the strip of plastic sheet material;
FIG. 11 is a sectional view, on an enlarged scale, taken along the line 11—11 of FIG. 6;
FIG. 12 is a sectional view, on an enlarged scale, taken along the line 12—12 of FIG. 6;
FIG. 13 is a sectional view, on an enlarged scale, taken along the line 13—13 of FIG. 8;
FIG. 14 is a transverse vertical sectional view, on an enlarged scale, of the heater section taken along the line 14—14 of FIG. 4;
FIG. 15 is a longitudinal vertical sectional view, on an enlarged scale, of the forming and cutting section shown in the preliminary forming position wherein the plastic sheet is partially formed by engagement of the plug-assist mold part therewith;
FIG. 16 is a fragmentary sectional view showing the article formed by the application of differential air pressure to cause it to conform to the cavity mold part;
FIG. 17 is a view similar to view 16 showing the mold parts in cutting position.

DESCRIPTION OF THE PREFERRED EMBODIMENTS

Figure 4:
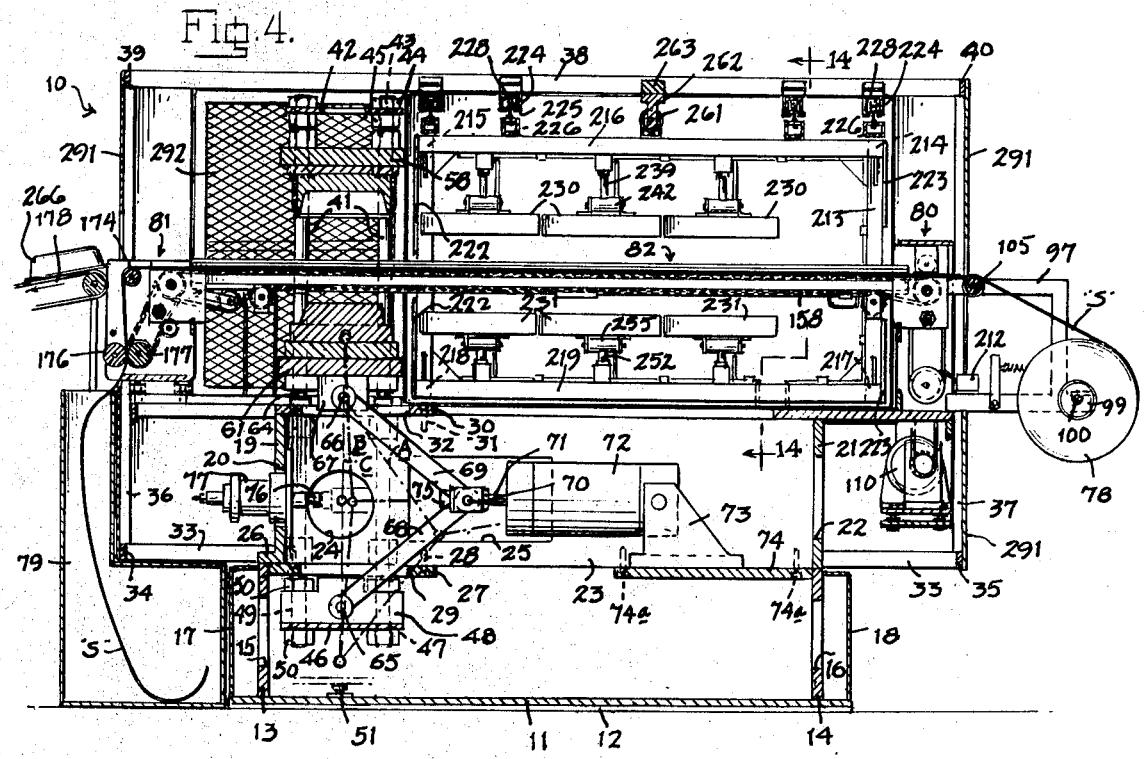
FIG. 4 is a longitudinal vertical sectional view, taken along the line 4—4 of FIG. 2.

Referring to the drawings, and more particularly to FIGS. 1-5, the machine for forming thermoplastic sheet material, according to the exemplary embodiment of the invention illustrated therein, comprises a frame and housing structure indicated generally as 10 of generally rectangular form in which the various components of the machines are supported and enclosed, and which is constructed, for the most part, from suitably shaped and fitted steel plates, bars, blocks and the like, secured together by welding, screws, bolts or other suitable means.

More particularly, the frame comprises a base weldment section consisting of a base panel 11 having a pair of longitudinally extending foot strips 12—12 welded to its underside, and forward and rearward end walls 13 and 14 welded to its upper side adjacent its forward and rearward ends, and respectively provided with rectangular openings 15 and 16. Formed end covers 17 and 18 are engaged over the outer sides of the respective end walls.

A drive weldment section is superimposed upon the base weldment section and comprises a rectangular box-like frame consisting of a forward end panel 19 having a rectangular opening 20, a rearward end panel 21 having a rectangular opening 22 and a pair of side panels 23—23, each having a forwardly disposed circular opening 24 and an intermediately disposed rectangular opening 25. A seating flange 26 is provided along the lower edge of the forward end panel. The drive weldment is of substantially less width than the end walls of the base weldment and is seated upon these end walls in centralized relation with the flange 26 engaged with and welded to the upper edge of the forward end wall and the rearward end panel engaged with and welded to the upper edge of the rearward end wall. A lower alignment plate 27 is secured by screws 28 to the lower edges of the side panels 23 and projects outwardly at each side from the side panels, with its forward edge abutting the inner side of the forward end wall 13 of the base weldment. A rectangular opening 29 is provided in the alignment plate and is of a width substantially corresponding to the distance between the inner faces of the side panels. An upper alignment plate 30 is secured by screws 31 to the upper edges of the side panels with its forward edge flush with the forward face of the end panel 19 and projects outwardly at each side from the side panels. A rectangular opening 32 substantially corresponding in width to the distance between the side panels is provided in the plate 30.

A pair of side rails 33 are secured upon the upper sides of the end walls 13 and 14 of the base weldment adjacent their side edges and project forwardly and rearwardly from the base weldment, their forward ends being connected by a transverse bar 34 and their rearward ends being connected by a transverse bar 35. This rectangular frame structure supports at its forward corners a pair of upright corner posts 36—36 and supports at its rearward corners a pair of upright corner posts 37—37, and upon the upper ends of these corner posts there is supported a rectangular frame structure comprising a pair of side beams 38—38 and forward and rearward transverse bars 39 and 40.

The box-like frame structure provided by the drive weldment and the alignment plates 27 and 30 constitute a fixed part of the frame structure 10 upon which the forming dies of the machine are mounted for relative vertical movement. The forming dies are carried upon a vertically movable die frame comprising four vertical guide rods 41, tied together at their upper ends by an apertured rectangular top plate 42 having holes 43 at its four corners, through which the upper threaded ends of the rods are engaged and rigidly secured by nuts 44 and 45 screwed upon the posts and engaged with the upper and lower sides of the plate. The rods are tied together at their lower ends by a rectangular bottom plate 46 having holes 47 in its four corners in which the lower threaded ends of the rods are engaged. A pair of bearing blocks 48—48 are mounted upon the upper side of the bottom plate adjacent its side edges, and are provided with bores 49 in register with the holes 47, the plate and bearing blocks being rigidly secured to the rods by nuts 50—50 screwed upon the rods and respectively engaged with the upper sides of the bearing blocks and the lower side of the plate. Vertically adjustable stops 51 are mounted upon the base panel 11 of the base frame to limit the down position of the die frame through engagement by the bottom plate 46.

The vertical guide rods 41 of the die frame are mounted for vertical reciprocatory movement in the box-like frame structure provided by the drive weldment and the alignment plates 27 and 30, and to this end the alignment plates are respectively provided at their four corners with vertically aligned bearing passages in which the rods are slidably received. In order to provide adequate bearing support for the rods, the alignment plates are respectively provided upon their opposed sides with bearing blocks 52 and 53, the plates and their respective bearing blocks having bores 54 and 55 provided with bearing bushings 56 and 57 in which the rods are slidably engaged.

An upper die plate 58 is carried upon the upper ends of the guide rods 41 beneath the top plate 42 for movement with the rods, and to this end is provided with holes 59 at its four corners engaged by the threaded upper end portions of the rods, where it is secured for vertical adjustment by nuts 60—60 engaged with its upper and lower sides. A lower die plate 61 is slidably mounted upon the rods for relative movement thereon into and out of relation with the upper die plate, and to this end is provided at its four corners with bores 62 having bearing bushings 63 secured therein in which the guide rods are slidably engaged. Bumper stops 64, preferably of rubber, are mounted on the upper alignment plate 30 for engagement by the lower die plate 61 to limit its down position.

A transverse shaft 65 is journaled in the bearing blocks 48—48 in vertically opposed relation to a transverse shaft 66 journaled in bearing portions 67—67 carried upon the under side of the lower die plate 61. The shafts 65 and 66 are connected by pairs of toggle levers 68—68 and 69—69 pivotably connected to the respective shafts 65 and 66 and pivotably connected together by shaft 70 carried upon the forward end of the piston rod 71 of an air cylinder 72 pivotably supported upon a bracket 73 mounted upon a horizontal platform 74 secured by screws 74a to the lower edges of the side panels 23—23 of the drive weldment. To the forward end of the pitson rod 70 a pressure plate 75 is secured and is adapted upon forward projecting movement of the piston rod to engage the piston 76 of a hold-and-release air cylinder 77, mounted within the opening 20 of the forward end panel 19 of the drive weldment. As will hereinafter more fully appear the hold-and-release air cylinder arrests the forward movement of the piston at a predetermined point during the forming cycle and thereupon releases it to permit further forward movement to effect the cutting operation upon the formed article.

The thermoplastic sheet material to be formed is disposed between the upper and lower die plates, as will presently more fully appear, the die plates being in separated relation to the sheet in a retracted position of the piston shaft 71 as seen in FIG. 4, wherein the toggle linkage has moved the die frame and the upper die plate 58 upwardly and has moved the lower die plate 62 downwardly upon the guide rods 41 of the die frame. Upon forward projecting movement of the piston rod the die frame and the upper die plate are move downwardly and the lower die plate is moved upwardly. A more detailed description of the forming dies and their operation will be given following the description of other components of the machine.

As clearly shown in FIGS. 4, 6, 8 and 14, the thermoplastic sheet material "S" is first carried from a roll 78 at the rearward end of the machine through a heating chamber where it is heated in successive stages preparatory to forming, is then moved in its heated state into relationship to the forming dies, which as will hereinafter more fully appear successively form the articles therefrom and at the same time produce a separation cut to enable the formed articles to be stripped from the sheet, and finally the scrap sheet material from which the articles have been stripped is carried into a receptacle 79 provided at the forward end of the machine, the formed articles being successively stripped from the sheet in its transition from the forming dies to the receptacle.

The mechanism for intermittently feeding the sheet is best illustrated in FIGS. 4-13 and comprises a drive assembly 80 mounted at the rearward end of the machine, a take-up and article stripping assembly 81 mounted at the forward end of the machine, and, a pair of sprocket chain carrier guide rail assemblies 82—82 connected to and extended between the rearward and forward assemblies 80 and 81.

The drive assembly 80 is carried upon a rearward auxiliary supporting frame comprising horizontal top and bottom plates 83—83 and a pair of vertical side plates 84—84 secured as by welding at their upper and lower ends to the top and bottom plates to form a generally rectangular frame structure. A horizontal mounting plate 85 is secured at its side edges by screws 86 to the inner sides of the upright plates 84 in upwardly spaced relation to the bottom plate 83 and is rigidly secured upon the drive weldment by screws 87 engaged with the upper edges of the side panels 23 of the drive weldment. Additionally, the plate 85 is secured by a transverse cross bar 88 connected between the upright corner posts 37—37 and secured by screws 89 beneath the rearward end of the plate 85.

The take-up and stripping assembly 81 is carried upon a forward auxiliary supporting frame comprising a horizontal base plate 90 and vertical side plates 91—91 secured as by welding to the bottom plate 90 with the latter projecting at each side of the side plates to form a generally U-shaped frame structure. Forwardly projecting supporting bars 92—92 are secured by screws 93 to the upper side of the upper alignment plate 30 and have their forward ends supported upon and secured by screws 94 to a transverse cross bar 95 connected between the upright corner posts 36—36. The projecting ends of the bottom plate 90 of the auxiliary frame are supported for vertical adjustment upon screw posts 96 mounted upon the upper sides of the bars 92.

A pair of roll supporting brackets 97—97 are secured by screws 98 upon the inner sides of the uprights 84 of the rearward auxiliary frame and project to the rear of the machine for convenient access to the sheet material roll 78 supported thereby. The core 99 of the roll is keyed upon a shaft 100 projecting at its end and seated in upwardly opening notches 101—101 provided in the brackets 97. A grooved brake wheel 102 is secured upon the shaft adjacent one end and is engaged by a spring loaded brake belt 103 of known design to frictionally resist free turning of the roll as the sheet 77 is intermittently drawn therefrom. The shaft 104 of a guide roller 105 over which the sheet is guided from the roll 78 to the intermittent feeding means is journaled at its ends in bearings 106—106 carried by the brackets 97. Guide collar rings 107—107 are mounted for axial adjustment upon the guide roller 105 for engaging the edges of the sheet "S" to maintain the latter in longitudinal alignment with the intermittent feeding means.

A motor support platform 108 is mounted on the bottom plate 83 of the auxiliary frame of the rearward drive assembly 80 upon vertically adjustable screw posts 109 and supports an electric motor 110 adapted through switch means, hereinafter more fully described, to be intermittently connected and disconnected to the drive means for intermittently advancing the sheet. The motor is provided with a suitable clutch and reduction gear unit 111 through which it drives a sprocket gear 112, connected by a sprocket chain 113 extending through a slot opening 114 in the mounting plate 85 to a sprocket gear 115 provided upon a transverse drive shaft 116 journaled at its ends in bearings 117—117 mounted upon the upright plates 84 of the auxiliary frame.

Sprocket gears 118—118 are keyed for axial adjustment movement in laterally spaced relation upon the drive shaft 116 for driving a pair of sprocket drive chains which are adapted to inter-engage with the marginal edges of the sheet to intermittently advance the sheet through the machine, as will presently more fully appear. The sprocket gears 118 form parts of a pair of laterally spaced and opposed sprocket chain drive assemblies which are mirror image counterparts of each other. For convenience of description only one of the drive assemblies will be described in detail and the same reference characters will apply to both assemblies. The sprocket gear 118 is disposed within a transversely adjustable rearward sprocket gear housing comprising an outer rectangular side plate 119, an inner rectangular side plate 120, and a spacer block 121 disposed between the lower end portions of the side plates, the outer side plate 119 having a shaft receiving hole 122, for the drive shaft 116 and being extended substantially above the plane of the guided sheet "S" as seen in FIGS. 8 and 9, while the inner side plate 120 is provided with a shaft receiving hole 123 and has its upper edge below the plane of sheet "S." The gear housing together with the sprocket gear 118 keyed to the drive shaft is adapted to be laterally adjusted in the machine to accommodate thermoplastic sheet material of different widths. To this end a transverse threaded shaft 124 non-rotatably supported at its ends upon the side plates 84—84 by means of lock nuts 125 is slidably engaged in a passage 126 through the gear housing, a pair of adjustment nuts 127 and 128 being provided upon the screw shaft for tightening against the side plates 119 and 120 to fix the position of adjustment. The gear housing is guided in its lateral adjustment movement upon a crossbar 130 connected between the side plates 84—84 and engaged in a notch 131 provided in the underside of the housing.

Figure 6:
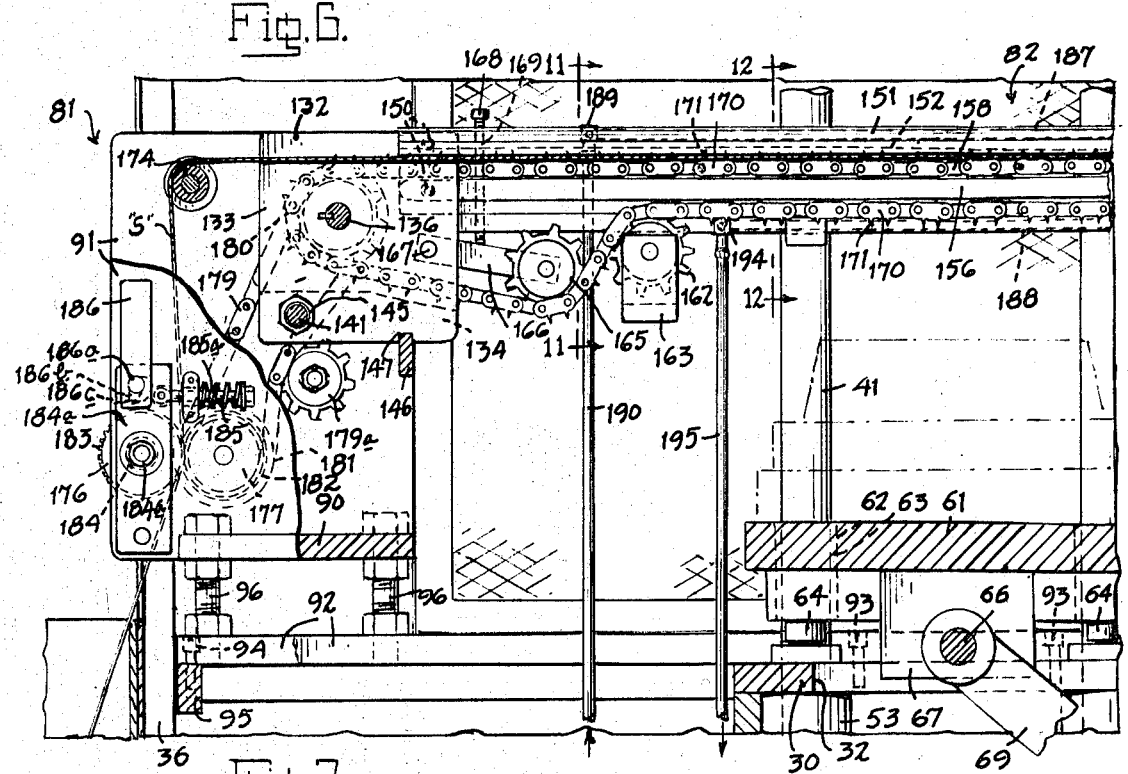
FIG. 6 is a longitudinal vertical sectional view, on an enlarged scale, of the formed take-up and stripping end of the feed mechanism.
Figure 7:
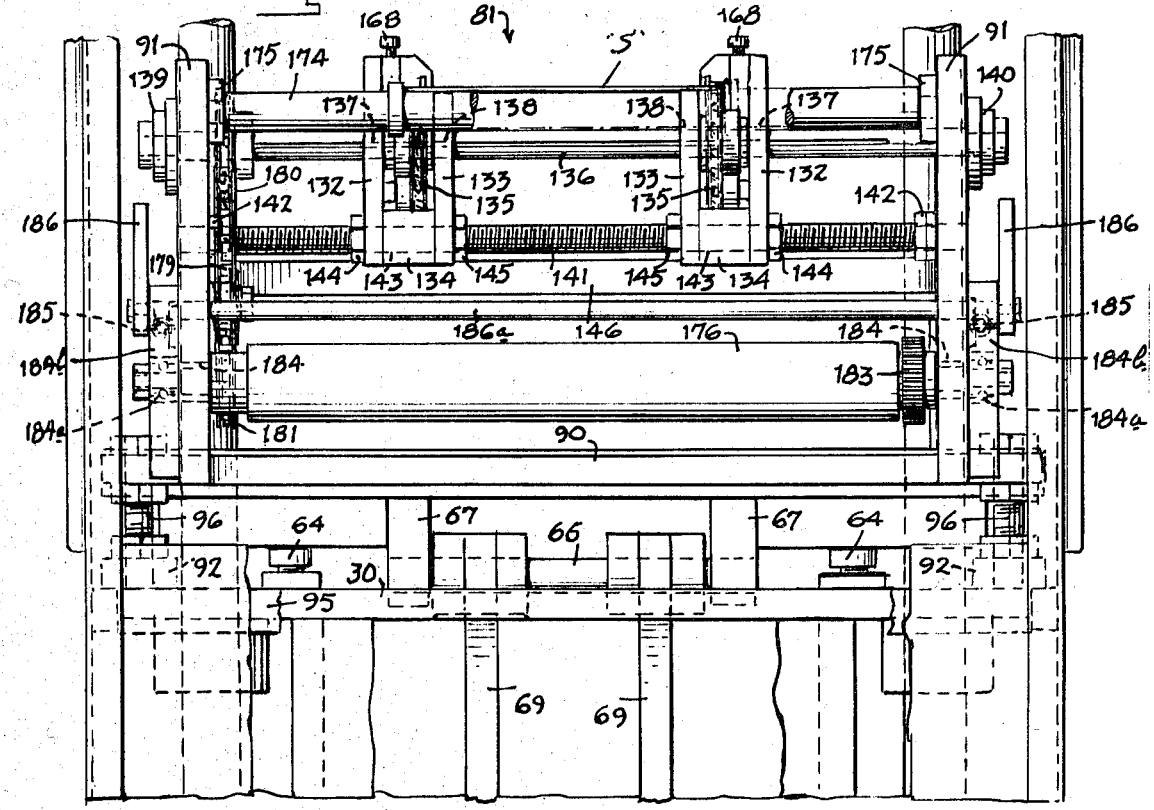
FIG. 7 is a front elevation partially in transverse vertical section of the structure shown in FIG. 6.

The sprocket chain drive assembly further comprises a transversely adjustable forward sprocket gear housing substantially similar to the rearward sprocket gear housing and disposed within the forward take-up and stripping assembly 81. As seen in FIGS. 6 and 7, the forward gear housing comprises an outer rectangular side plate 132, an inner rectangular side plate 133 and a spacer block 134. A driven sprocket gear 135 is disposed between the side plates and is adjustably keyed upon a shaft 136 engaged in holes 137 and 138 in the respective side plates and having its ends journaled in bearings 139 and 140 carried by the side plates 91—91 of the forward auxiliary frame. In similar manner to the rearward assembly, a screw shaft 141 has its ends fixedly mounted upon the side plates 91—91 by lock nuts 142 and the shaft is slidably engaged in a passage 143 through the housing with adjustment nuts 144 and 145 screwed upon the shaft at each side of the housing to permit its lateral adjustment and to fix its position of adjustment. The gear housing is guided in its lateral adjustment movement upon a cross bar 146 connected between the side plates 91—91 and engaged in a notch 147 provided in the underside of the housing.

The sprocket gear drive assembly further comprises the guide rail assembly 82 connected between the gear housing of the rearward drive assembly 80 and the gear housing of the forward take-up and stripping assembly 81. The guide rail assembly comprises a main beam 148 having its rearward end secured by screws 149 to the outer side plate of the rearward gear housing and its forward end secured by screws 150 to the outer side plate of the forward gear housing. Upon the inner side of the main beam 148 and extending above its upper edge, there is provided a guide strip 151 provided along its underside with a longitudinal groove 152 for guiding the upper reach of the sprocket chain, as will presently more fully appear, and upon the outer side there is provided a positioning strip 153 having its upper and lower longitudinal edges parallel to and offset above and below the upper and lower longitudinal edges of the main beam, the strips 151 and 153 being secured to the main beam by cap screws 154 and 155 as seen in FIGS. 10–13.

A rail 156 for supporting the upper reach of the sprocket chain is mounted in parallel spaced relation beneath the guide strip 151 upon the inner side of the main beam 148 by means of cap screws 157 and spacer sleeves 157a, the latter spacing the rail outwardly from the main beam.

An endless sprocket chain 158 is trained over the driving sprocket gear 118 of the rearward drive assembly 80 and the driven sprocket gear 135 of the forward take-up and stripping assembly 81 with its upper reach supported upon the rail 156. The lower reach of the sprocket chain is trained over an idler sprocket gear 159 journaled in a hanger bracket 160, secured by screws 161—161 to the strip 153 adjacent the rearward assembly, and over an idler sprocket gear 162 journaled in a hanger bracket 163, secured by screws 164 to the strip 153 adjacent the forward assembly.

A tightener sprocket gear 165, journaled upon the end of a lever 166 is pivotally mounted upon a shaft 167 connected between the side plates 132 and 133 of the forward housing, is engaged with the upper side of the sprocket chain between the idler gears 135 and 162 and is adapted to exert tightening pressure upon the sprocket chain, being adjustably pressed into engagement with the chain by an adjustment screw 168 engaged in a threaded hole 169 in the main beam 148 and bearing upon the lever 166.

The sprocket chain is of conventional design, except that the one side plate 170 of each alternate link is provided upon its outer edge with a pair of sharp pointed prongs 171 which are adapted to penetrate the marginal edge portion of the thermoplastic sheet "S" to provide a positive driving connection therewith, the projected ends of the teeth being guided in the groove 152 of the strip 151 so that the margin of the sheet is sandwiched between the sprocket chain and the strip 151. In order to insure penetration of the sheet as the latter is moved from the roll 78 into relation with the sprocket chain, a grooved pressure roller 172 is journaled in a bracket 173 mounted upon the side plate 119 of the rearward housing and is adapted to engage the upper side of the sheet in vertically opposed relation to the drive gear 118, so that as the sprocket chain moves into engagement with the underside of the sheet, the sheet is pressed against the sprocket chain causing the prongs 171 to penetrate the sheet and project into the groove of the pressure roller 172.

As the advancing sheet moves over the forward idler gear 135 following the forming operation thereon the prongs disengage from its margin and the sheet is carried forwardly in a tangential path from the sprocket chain over a stripping roller 174, rotatably mounted at its ends in brackets 175—175 secured to the side plates 91—91 of the forward auxiliary frame, and downwardly from the stripping roller between a pair of take-up rollers 176 and 177 rotatably mounted at their ends in the side plates 91, the strip moving from the take-up rollers into the receptacle 79. As the flexible sheet bends about the stripping roller the relatively stiff formed articles are stripped from the sheet through severance of their marginal edge and fall upon a conveyor belt 178 suitably arranged on the forward end of the machine as seen in FIG. 4.

The take-up rollers 176 and 177 are driven from the shaft 136, upon which the driven sprocket gears 135 are keyed, by means of a sprocket chain 179 trained over sprocket gears 180 and 181 respectively provided upon the shaft 136 and the roller 177. An adjustably mounted idler gear 179a is engaged with one side of the chain 179 to keep it tight. The roller 177 is provided at its opposite end from the gear 181 with a spur gear 182 meshing with a spur gear 183 provided upon the take-up roller 176, so that as the roller 177 is driven in a counter-clockwise direction the roller 176 is driven in clockwise direction.

The roller 176 is normally pressed toward the roller 177 to engage the strip of thermoplastic sheet material "S" with yielding pressure, as seen in FIGS. 6 and 7, and to this end the shaft ends of the roller 176 extend through elongated openings 184 in the respective side plates 91, each shaft end being rotatably mounted in a bearing 184a carried on a pressure lever 184b pivotably mounted on the outer side of each side plate, the roller 176 being normally drawn toward the roller 177 through the action of a spring 185 mounted upon pull-rod 185a. Release levers 186—186 are mounted on the ends of a shaft 186a having bearing in the side plates 91, each release lever being provided with a cam 186b engaged in an opening 186c in each of the respective pressure levers 184b, so that upon inward swinging of either of the release levers the pressure levers are swung outwardly against the pressure of the springs 185 and separate the roller 176 from the roller 177.

As the thermoplastic sheet is advanced between the rearward drive assembly and the forming dies, it is heated by a series of heating units, presently to be more fully described. In order to prevent excessive heating of the sprocket chains and the guide rail structures supporting them means is provided for circulating a coolant liquid in heat dissipating relation therewith. As clearly shown in FIGS. 10–12 upper and lower tubes 187 and 188 of square cross-section are mounted along the upper and lower sides of the main beam 148, the upper tube being positioned between the upper end portions of the strips 151 and 153, and the lower tube being positioned against the lower portion of the strip 153. The tubes may be suitably secured by screws, welding, or the like. An inlet fitting 189 connected to an inlet pipe 190 is provided at the forward end of the upper tube, the rearward ends of the upper and lower tubes are provided with fittings 191 and 192 having a pipe connection 193 between them, and the forward end of the lower tube is provided with an outlet fitting 194 connected to an outlet pipe 195. The inlet pipe 190 and the outlet pipe 195 are suitably connected to a source of coolant liquid, not shown, which is circulated under pressure through the tubes to thus continuously dissipate heat from the sprocket chains and the guide rail supporting structure.

During the forming cycle of the machine, at which time the forming dies engage the heated sheet to form the article therefrom, the sheet is stationary and, at the end of the forming cycle the motor 110, which has been stopped at the beginning of the forming cycle, is restarted to drive the sprocket chain and advance the sheet carried thereby a predetermined distance to bring a section of the heated sheet into co-operative aligned relation with the forming dies.

In order to accurately predetermine the increment of movement of the sheet a feed stroke adjustment assembly is provided as shown in detail in FIGS. 7 and 8. This comprises a V-groove pulley 196 fixed upon the drive shaft 116 and connected by a V-belt 197 to an adjustable V-groove pulley 198 having its shaft 199 journaled in a bearing 200 secured upon the vertical side plate 84. The V-groove pulley 198 is formed of two axially adjustable sheave parts and is adapted through axial adjustment to increase or decrease its effective diameter so as to change the ratio between it and the pulley 196. Pulleys of this type are well known, and it is sufficient for the present disclosure to point out that the adjustment of the pulley 198 is accomplished through turning a hand screw 201 to effect relative axial movement to the movable sheave part of the pulley. The screw extends through a hole 202 in a bracket 203 mounted upon the plate 85 and its position of adjustment is fixed by lock nuts 204 and 205 engaged with the opposite sides of the bracket. The hand screw is adapted to impart axial movement to a bearing member 206 to which one part of the adjustable pulley is rotatably connected, the bearing member being held against rotation by an angular arm 207 slidable in a slot 208 in the bracket 203.

A disc 209 fixed to the shaft of the pulley 198 is provided with a cam plate 210 which is adapted at the end of a single revolution to engage the roller arm 211 of a micro-switch 212 which effects de-clutching of the motor 110 and at the same time initiates the forming cycle of the machine through suitable electrically connected timer control means of well known design (not shown), the motor clutch being reconnected through such time control means at the end of the forming cycle.

The heater means for heating the thermoplastic sheet in successive stages immediately preceding the movement of the sheet into relation with the forming dies is positioned in the intermediate section of the framework of the machine, and comprises a pair of left and right heater assemblies adapted to have transverse lateral movement into and out of operative relation with the sheet, and each carrying upper and lower heater units arranged in series above and below the thermoplastic sheet. The heater assemblies are of identical but opposite construction, one being a mirror image of the other, so that a detail description of only one of the assemblies will be given and the same reference characters will be applied to both assemblies.

Each heater assembly comprises a box frame weldment preferably formed of square tubing and consisting of a rectangular outer vertical frame part 213, a top horizontal frame part comprising end beams 214 and 215 and a longitudinal inner beam 216, and a lower horizontal frame part comprising end beams 217 and 218 and a longitudinal inner beam 219. An outer cover plate 220 is secured upon the vertical frame part 213 and is provided with a handle 221 to facilitate the manual manipulation of the heater assembly into and out of operative relation. A pair of forward insulation cover plates 222—222 of asbestos or other suitable insulating material is provided upon the forward end of the frame in vertically spaced relation to provide a passage for the thermoplastic sheet, and similarly a pair of vertically spaced insulation cover plates 223—223 is provided upon the rearward end of the frame.

Figure 5:
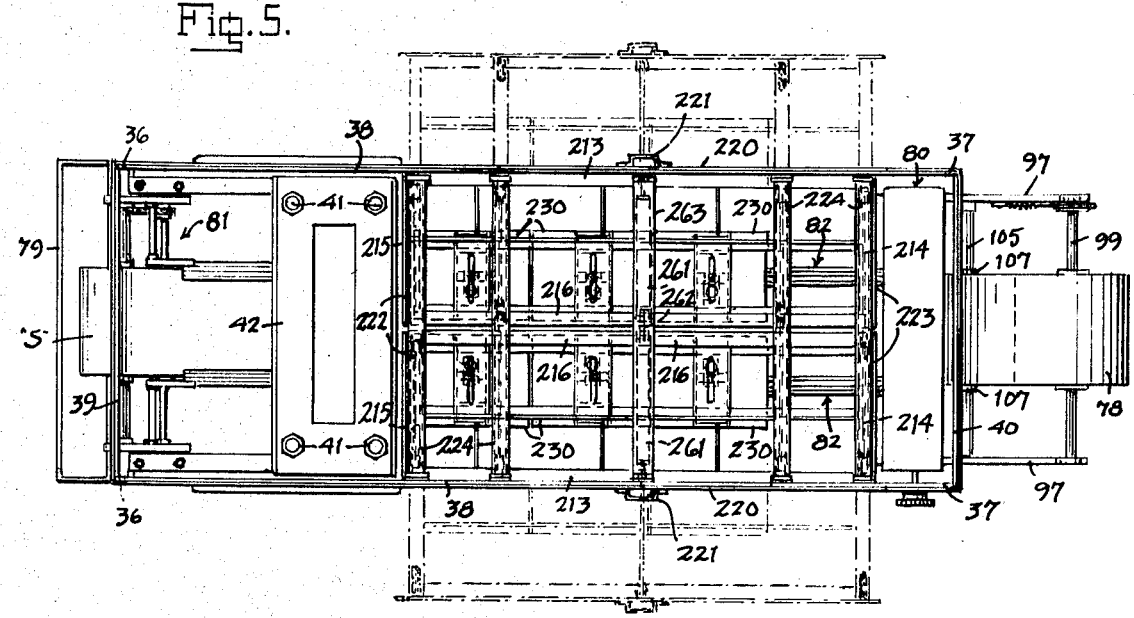
FIG. 5 is a top plan view.

The pair of heater assemblies, as shown in FIGS. 4, 5 and 14, are suspended for lateral movement into and out of operative relation, and to this end four transverse trackways 224 are secured to and extend between the upper longitudinal beams 38—38 of the main frame of the machine, these trackways being in the form of inverted channels having inwardly extending flanges 225—225 at the lower edges of their side walls. Two outer and inner trackways are provided adjacent each end of the heater section, one heater assembly being supported upon the two outer trackways and the other assembly being supported upon the two inner trackways. A pair of trolley bars 226—226 is secured upon the upper frame part of each of the heater assemblies in position to align with the pair of trackways to support each respective assembly, each trolley bar being provided with three laterally spaced hangers 227 having rollers 228 engaged with the flanges 225 of the trackways 224. The hangers of each trolley bar are so spaced that the heater assemblies will be disposed directly beneath that of the hangers to thus provide stable support in the closed operative position, and enable easy movement to the open inoperative position as shown by the dot-and-dash lines in FIGS. 2 and 5, where two of the hangers provide cantilever suport. The outward movement of the heater assemblies to their inoperative or open position is limited by stop plates 229 provided intermediate the trackways for abutment by the innermost hangers.

While any suitable number of electric radiant heater units may be employed, each of the heater assemblies as shown in the illustrated embodiment of the invention is provided with three upper heater units 230, arranged in longitudinal side-by-side succession and three similarly arranged lower heater units 231. The heater units of the upper series are suspended from the upper part of the heater frame by horizontal plates 232 secured along their longitudinal edges upon ledge strips 233—233, secured to the longitudinal beam 216 and to an intermediate longitudinal beam 234 connected at its ends to the end beams 214 and 215. The plates are provided with transverse slots 235, one for each heater unit, each slot receiving the threaded stud 236 of a transversely adjustable heater support bracket 237 fixed in its position of transverse adjustment by a clamping nut 238. A vertically adjustable threaded post 239 is engaged at its upper threaded end in an opening 240 in the bracket and is fixed in its position of vertical adjustment by clamping nuts 241—241. At its lower end the post is connected to the heater unit by a knuckle-joint 242 which permits angular adjustment of the heater unit about a longitudinal axis, the position of angular adjustment being fixed by tightening nuts 243—243 upon the shaft of the knuckle-joint.

The lower heater units 231 are supported upon the lower part of the heater frame in substantially similar manner to the upper heater units upon horizontal plates 244, secured along their longitudinal edges upon ledge strips 245 and 246 secured to the beam 219 and to a longitudinal beam 247 connected at its ends to the end beams 217 and 218. Each plate is provided with a transverse slot 248 receiving the threaded stud 249 of a heater support bracket 250 secured in its position of transverse adjustment by a clamping nut 251. The lower threaded-end of a vertically adjustable post 252 is engaged in an opening 253 in the bracket and is fixed in its position of vertical adjustment by clamping nuts 254—254. At its upper end the post is connected to the heater unit by a knuckle-joint 255 which permits angular adjustment of the heater unit, the position of angular adjustment being fixed by tightening nuts 256—256 upon the shaft of the knuckle-joint.

Each heater unit is provided with a junction box 257 connected by a conductor 258 to an electrical current source. In each heater assembly the conductors are preferably carried through the tubes 259 mounted on the frame to the lower inner longitudinal beam 219 from which they extend as a multiconductor cable 260 to a suitable switch and heat control unit, not shown, wherein the current of one or more of the units may be turned "on" or "off" and, through suitable thermostatic controls, the current supplied to each heater unit may be regulated so as to maintain a predetermined heat output. The conductors may if desired be carried through suitable conduits arranged exteriorly on the beams of the frame.

While the heater assemblies may be manually moved between their operative closed position and their in-operative open position, they are preferably provided with power means to effect such movements. Such power means may comprise a pair of air cylinders 261—261, supported at their inner ends in oppositely directed relation upon a bracket 262 secured upon a centrally disposed cross-beam 263 connected to and extending between the longitudinal beams 38—38 of the main frame, and having their piston rods 264—264 respectively connected to a clevis 265 mounted upon the outer frame part 213 of each heater assembly. These air cylinders may be controlled by conveniently located push buttons or the like, not shown. Thus, in the event of an emergency, such as overheating or jamming, the heaters may be quickly moved out of heating relation with the thermoplastic sheet.

In the operation of the machine, the thermoplastic sheet 77 is intermittently advanced between each forming operation by the forming dies and is progressively heated as each article forming section is successively disposed between the succession of upper and lower heater units, a heated section to be formed moving into alignment with the forming dies immediately following the final complete heating of the sheet by the last heater units contiguous to the forming dies.

In the illustrated embodiment of the invention the forming dies are designed to produce a relatively deep wall container of rectangular outline, for example, a container 266 as shown in FIG. 4. The dies for this purpose comprise an upper cavity die or mold 267 mounted upon the underside of the upper die plate 58 and provided with a cavity 268 shaped to produce the external bottom and side wall surfaces of the container, and a lower plug-assist die or mold 269 mounted upon the lower die plate 61 and provided with a plug formation 270 substantially conforming in shape to the inner surface of the bottom and side walls of the container, but of slightly smaller dimensions, so that in the fully engaged position of the plug 270 within the cavity 268, the spacing between the opposed surfaces of the cavity and plug is slightly greater than the thickness of the bottom and side walls of the container, for a purpose presently to more fully appear. During the forming operation vacuum is applied to the cavity surface at one stage and pressure is applied in another stage, and for this purpose suitably arranged air ducts 271 extending from the surface of the cavity to a manifold space 272, in communication through a passage 273 with a pipe line 274 whereby through suitable valve means controlled by a timing mechanism, not shown, the cavity is subjected to either vacuum pressure, or atmosphere. The plug die or mold is similarly provided with ducts 275 extending from its surface to a manifold space 276 in communication to a passage 277 with a pipe line 278. Hollow coolant units 279 and 280 having feed lines 281 and 282 connected thereto may be respectively interposed between the die plates 58 and 62 and the mold parts 267 and 269.

In surrounding relation to the plug 270, the plug die is provided with a flat surface 283 engaged by the lower side of the thermoplastic sheet, and surrounding the cavity mold 267 is a blade member 284 having a sharpened blade position 285 which projects below the lower side of the cavity mold in opposed relation to the flat surface 283 of the plug mold, and which is adapted, as will hereinafter more fully appear, to form a seal in surrounding relation to the section of the thermoplastic sheet being formed in the mold. At the completion of the molding operation, through relative movement of the mold parts towards each other, the thermoplastic sheet is cut or penetrated to an extent whereby the formed article is substantially severed from the sheet with a very thin web or membrane remaining sufficient to permit the formed article, following separation of the mold parts, to be transported with the advance of the strip "S" from between the separated mold parts to the stripping roller 174. The thermoplastic sheet is thereupon sharply bent over the stripper roller, causing the web connection with the formed article to progressively break along the edges of the article, which by virtue of its relative stiffness as compared to the bendable strip "S," moves in a tangential direction beyond the stripping roller on to the conveyor belt 178 as seen in FIG. 4.

The sequence of operations during the forming cycle is best illustrated in FIGS. 4 and 15–17. A section of the thermoplastic strip "S" is advanced through the intermittent movement of the sprocket chains 158 into position between the forming dies or molds in a heated state, which due to the close proximity of the heaters 230 and 231 to the forming dies is at its optimum, whereupon the toggle levers 68 and 69 are moved by the air cylinder 72 from the normal open position shown in full lines in FIG. 4 to the position shown by the dot-and-dash lines A. In this position the lower plug die remains in its lowered position against the stops 64 and the upper cavity die is moved downwardly to the point where the bottom plate 46 engages the stops 51 and the blade edge 285 of the upper die contacts the sheet.

The lower plug die is thereupon raised through movement of the toggle levers from the dot-and-dash line position A to the dot-and-dash position B, in which position the pressure plate 75 is stopped in its forward movement through engagement with the piston 76 of the hold-and-release air cylinder 77, the piston being retained in this position through suitable control valve means regulating the pressure applied to the cylinder. In this position the thermoplastic material is formed in the dies, being first drawn through the entrance of the plug 270 into the cavity 268 into a draped position over the plug as shown in FIG. 15. In this position the thermoplastic material is in contact with the plug and out of contact with the cavity. Vacuum may be applied through the ducts 271 of the cavity mold and pressure may be simultaneously applied through the ducts 275 of the plug die causing the thermoplastic material to be forced away from the plug into contact with the cavity 268 as shown in FIG. 16. During this operation the blade edge 285 presses the thermoplastic sheet into firm contact with the flat surface 283 surrounding the plug die thus providing a peripheral seal. The blade is thereupon caused to substantially wholly penetrate the thermoplastic sheet, leaving only a thin web or membrane of the material, so that the formed article may be transported from the forming dies as the sheet is advanced and then separated therefrom as the sheet moves around the stripping roller 174 as seen in FIG. 4. For this purpose the piston 76 is released from its holding position through suitably timed operation of the valve means controlling the hold-and-release cylinder 77, allowing the toggle levers to move from the dot-and-dash line position B to the substantially vertically aligned dot-and-dash line position C, causing the lower die to move upwardly to press the flat surface 283 toward the blade edge 285 to cause the latter to substantially wholly penetrate the sheet, as seen in FIG. 17.

The dies thereupon move to their open position through retraction of the toggle levers, the lower plug die first moving downwardly to engage the stops 64 and remove it from the formed article, this being the dot-and-dash line position A. The upper cavity mold is thereupon raised out of contact with the formed article through movement of the toggle levers to their normal position as shown in full lines in FIG. 4, whereupon the drive chains are activated to advance the thermoplastic sheet to bring a new heated section into place for repetition of the forming cycle and to cause the relatively rigid formed article to be separated from the flexible sheet through bending of the sheet over the stripping roller 174.

In order to protect the apparatus suitable cover panels 291 are secured to the frame sturcture. The forming section of the apparatus is preferably provided at opposite sides with wire mesh doors 292 for visual observation and easy access to the forming dies. In order to manually operate or adjust the drive chains one end of the drive shaft 116 is extended through a hole 293 in the cover panel 291 and provided with a hand wheel 294.

It will be understood that the coordinated operation of the air cylinder 71 and 77, the motor 110, and the supply of vacuum and/or pressure to the mold parts, as well as regulation of the heaters, is controlled by suitable automatic means and circuitry of well known engineering design, so that further detail description thereof is not deemed necessary.

I have illustrated and described preferred and satisfactory embodiments of the invention, but it will be understood that changes may be made therein within the spirit and scope thereof, as defined in the appended claims.

What is claimed is:

1. In an apparatus for forming and cutting drawn articles from thermoplastic sheet material, a supporting frame, means carried by said supporting frame for supporting a roll of thermoplastic sheet material from which a strip of said material is delivered forwardly, conveyor means for advancing said sheet material forwardly from said roll, heater means arranged to heat said sheet material, forming and cutting means forwardly of said heater means arranged to engage said sheet material and form and cut articles therefrom, and strapping means forwardly of said forming and cutting means arranged to remove formed and cut articles from said strip of sheet material, said forming and cutting means comprising upper and lower movable mold parts disposed above and below said sheet material, a single power drive toggle lever means connected to both said mold parts for moving them toward and away from each other into and out of forming relation with said sheet material, one mold part having an article shaping formation and a cutting blade surrounding said formation, and the other mold part having an article shaping formation and a flat surface surrounding said formation and opposed to said cutting blade for supporting said sheet material for sealing and cutting engagement by said blade, the article shaping formation of one mold part being a cavity and the article shaping formation of the other mold part being a plug, and hold-and-release means for arresting said movement of at least one mold part toward the other mold part in a hold position to a point where said blade and flat surface are in sealing and holding engagement with said sheet material, and which in a release position permits further movement of at least one mold part toward the other mold part to a point where said sheet material is penetrated by said blade to an extent short of complete severance in surrounding relation to an article formed by said mold parts to thereby form a breakaway connection between the formed article and the sheet material, whereby the formed article may be readily separated from the sheet material.

2. An apparatus as defined in claim 1, further characterized by movable guide means having one mold part fixed thereto at one side of said sheet material and the other mold part movable thereon at the other side of said sheet material, and wherein said toggle lever means is connected at one end to said guide means and at its other end to said other mold part, whereby actuation of said toggle lever means in one direction moves said mold parts toward each other to a closed position relative to said sheet material, and in the other direction moves said mold parts away from each other to an open position relative to said sheet material, stops means for limiting the movement of said guide means and said one mold part in closing direction while said other mold part is in open position, and stop means for limiting the movement of said other mold part in opening direction while said guide means and said one mold part are in closed position.

3. An apparatus as defined in claim 1, wherein said heater means comprises a pair of heater supports disposed one at each side of the longitudinal center line of said sheet material, angularly adjustable heater units carried by said supports for disposition in heating relation above and below said sheet material at each side of said center line, and horizontal track means spanning said supporting frame slidably supporting said heater supports whereby they are individually movable transversely to bring said heater units from a position within said frame in heating relation to said sheet material to a position outside of said frame.

4. An apparatus for forming and cutting drawn articles from thermoplastic sheet material, comprising a supporting frame comprising a rearward frame part, and a forward frame part, support means carried by said rearward frame part for a roll of thermoplastic sheet material from which a strip of said material is delivered forwardly, a rearward drive assembly carried by said rearward frame part comprising a transverse drive shaft, and a pair of transversely spaced sprocket gear assemblies, each comprising a gear housing and a sprocket gear keyed to said drive shaft and transversely adjustable thereon to vary the transverse spacing of said drive assemblies, a forward take-up assembly carried by said forward frame part comprising a transverse driven shaft, and a pair of transversely spaced sprocket gear assemblies, each comprising a gear housing and a sprocket gear keyed to said driven shaft and transversely adjustable thereon to vary the transverse spacing of said take-up assemblies, a pair of longitudinal guide rail assemblies respectively connected at their rearward and forward ends to said housings of said pairs of rearward and forward sprocket gear assemblies, a pair of sprocket conveyor chains respectively trained over said pairs of sprocket gears of said rearward and forward pairs of sprocket gear assemblies, each said chain including an upper reach supported upon a respective guide rail upon which a margin of said sheet material is supported, securing means carried by said chains for securing said sheet material thereto for movement forwardly with said chains, heater means forward of said drive assembly arranged to heat said sheet material, forming and cutting means between said heating means and said take-up assembly arranged to engage said sheet material and form and cut articles therefrom, and means for imparting intermittent rotary movement to said drive shaft whereby said sprocket chains are intermittently advanced to bring successive areas of said sheet material into successive relation with said heater means and said forming means.

5. An apparatus as defined in claim 4, further characterized by transversely disposed positioning means engaged with said gear housing of said guide assembly for fixing their position of transverse adjustment upon said drive shaft, and transversely opposed positioning means engaged with said gear housings of said take-up assembly for fixing their position of transverse adjustment upon said driven shaft.

6. An apparatus as defined in claim 4, wherein said drive assembly further comprises a motor for driving said drive shaft, a timing cam driven by said drive shaft, means for adjusting the ratio of movement between said drive shaft and said cam, and switch means arranged for actuation by said cam to de-activate the driving relation between said motor and said drive shaft following a predetermined period of operation.

7. An apparatus as defined in claim 4, wherein said take-up assembly further comprises a stripping roller over which said sheet material is carried from said conveyor chains, and a pair of take-up rollers between which said sheet material is engaged and drawn thereby from said stripping roller.

8. An apparatus as defined in claim 7, further characterized by intermeshing gear means carried by said take-up rollers for effecting rotation thereof in opposite directions, and means for driving one of said take-up rollers from said driven shaft.

9. An apparatus as defined in claim 7, further characterized by spring means for pressing said take-up rollers toward each other, and release means for separating said take-up rollers against the pressure of said spring means.

10. An apparatus as defined in claim 2, further characterized in that said hold-and-release means comprises a fluid actuator engaged by said toggle lever means and initially pressurized to cause the said arresting of the movement of said mold part.

11. An apparatus as defined in claim 10 further characterized in that said fluid actuator is provided with a limiting adjustable stop for predetermining the degree of said sealing engagement of said blade with said sheet material.

12. An apparatus as defined in claim 10 and means for releasing the pressure in said fluid actuator to allow further movement of said toggle to cause said blade to sever said sheet material.

References Cited
UNITED STATES PATENTS 3,059,810 10/1962 Edwards _____ 18—19PX
3,113,345 12/1963 Butzko _____ 18—19F J. SPENCER OVERHOLSER, Primary Examiner J. E. ROETHEL, Assistant Examiner U.S. Cl. X.R.

18—19